Sept. 5, 1967     JAMES E. WEBB     3,339,863
ADMINISTRATOR OF THE NATIONAL AERONAUTICS
AND SPACE ADMINISTRATION
SOLAR VANE ACTUATOR Filed Sept. 16, 1965     2 Sheets-Sheet 1

JOHN C. NICKLAS
JAMES D. ACORD
    INVENTORS

BY
    ATTORNEYS

Sept. 5, 1967    JAMES E. WEBB    3,339,863
ADMINISTRATOR OF THE NATIONAL AERONAUTICS
AND SPACE ADMINISTRATION
SOLAR VANE ACTUATOR
Filed Sept. 16, 1965    2 Sheets-Sheet 2
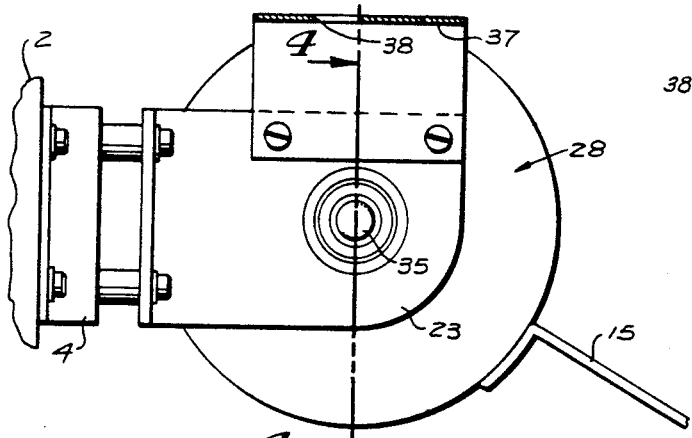
FIG. 6
FIG. 3
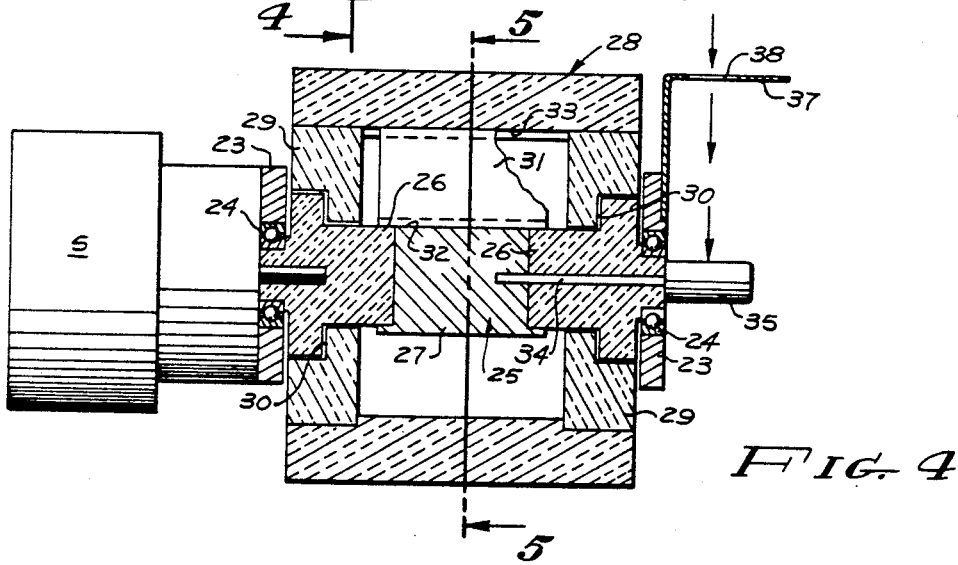
FIG. 4
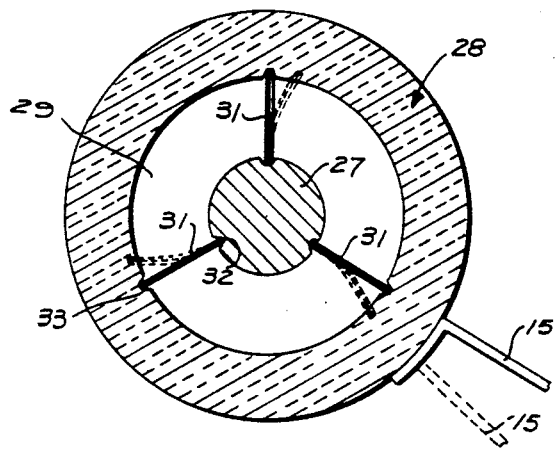
FIG. 5
JOHN C. NICKLAS
JAMES D. ACORD
INVENTORS
BY
ATTORNEYS ര
United States Patent Office 3,339,863
Patented Sept. 5, 1967

3,339,863
SOLAR VANE ACTUATOR
James E. Webb, Administrator of the National Aeronautics and Space Administration, with respect to an invention of John C. Nicklas, Arcadia, and James D. Acord, La Canada, Calif.
Filed Sept. 16, 1965, Ser. No. 487,939
8 Claims. (Cl. 244—1)

ABSTRACT OF THE DISCLOSURE

A solar vane actuator in an attitude control system for spacecraft is provided which includes sensory means responsive to heating by the sun's rays to distort a bimetallic element by which the actuator is rotated in small increments to produce a damping action about a stable attitude of the spacecraft with respect to radiation from the sun.

The invention described herein was made in the performance of work under a NASA contract and is subject to the provisions of Section 305 of the National Aeronautics and Space Act of 1958, Public Law 35–568 (72 Stat. 435; 42 U.S.C. 2457).

This invention is directed to a solar vane actuator useful in an attitude control system such as is described in the co-pending application, Ser. No. 388,966 filed Aug. 11, 1964, for Attitude Control for Spacecraft. The system therein described utilizes the solar radiation issuing from the sun to produce a force and combines a bimetallic actuator and thermal sensor arrangement to utilize this force by varying a set of vanes thus changing that surface of the vehicle which is exposed to such radiation.

The referenced application shows one means of using the thermal sensor and bimetallic actuator in combination to accomplish the movement of the vane members, wherein this application is directed to a second means for combining the same elements which in some applications may be more desirable.

It has been known for many years that the solar radiation issuing from the sun produces a force when striking a surface. This is sometimes referred to as radiation pressure.

This radiation issuing from the sun, when coming in contact with objects such as panels, or vanes, or solar sails can be useful in several ways on long time space flights. Therefore, if variable surfaces such as vanes are made a part of a spacecraft and positioned properly about the center of gravity thereof they can be used to make vernier attitude corrections. It is the purpose of the instant invention to provide an actuator which utilizes the sun's radiant heat in combination with bimetallic elements to vary the position of the vanes in a manner to give attitude control to the spacecraft.

Accordingly, an object of the instant invention is to provide an attitude control actuator for driving movable control surfaces exposed to solar pressure so that through an adjustment of these surfaces the incident solar pressure is employed to impart torque to a spacecraft about an axis extending through the center of the mass thereof.

Another object is to provide an attitude control surface actuator for use in a spacecraft which employs the radiant energy from the sun to cause movement of temperature responsive elements arranged to alter the position of control surfaces.

Still another object is to provide in a spacecraft a means for varying the effect of radiant energy on the spacecraft as a change in attitude of the spacecraft is experienced.

A further object is to provide an attitude control surface actuator for spacecraft wherein the response to solar radiation is self damping so as to minimize oscillating or hunting movements of the spacecraft.

Other objects and advantages of the invention will become evident from the following detailed description and drawings in which:

FIGURE 3 is an enlarged view showing the control mechanisms for the vane actuator as shown in FIGURE 2.

FIGURE 4 is a sectional view taken along lines 4—4 of FIGURE 3.

FIGURE 5 is a transverse sectional view of the actuator of FIGURES 3 and 4. This view is taken along lines 5—5 of FIGURE 4.

FIGURE 6 is a top plan view of a portion of the actuator assembly to show the relationships among parts thereof.

Figure 1:
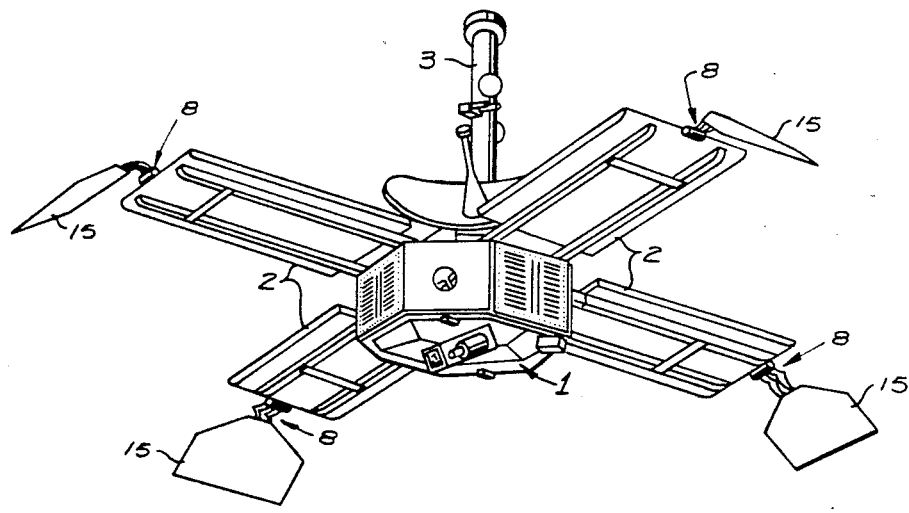
FIGURE 1 is a perspective view of a typical spacecraft.
Figure 2:
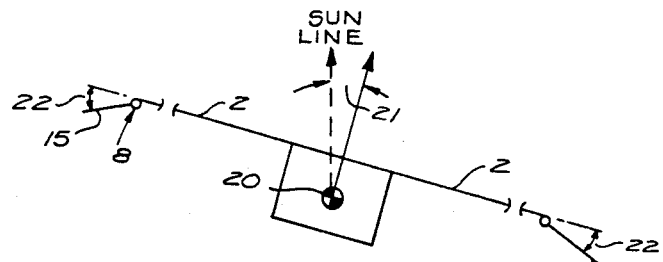
FIGURE 2 is a diagrammatic view illustrating control vectors for the spacecraft.

Reference is now directed to FIGURES 1 and 2. A typical spacecraft may involve a central body or mass 1 having radiating arms 2 which may comprise solar panels. The central body contains or carries the various instruments, antennas, and controls needed (not designated) for proper performance of the spacecraft, and may include a low gain antenna mast 3.

At the extremity of each panel or arm 2 is a bracket 4 extending radially outwardly from the panel and supporting a positioning motor 5 and an actuator 8 and a vane 15. The positioning motor is adapted to actuate the shaft structure of the actuator and is secured to the radial mounting arm 23. The construction here described may be considered as conventional.

The vane 15 provides a movable control surface which is exposed to the solar pressures previously mentioned herein so that by the adjustment of the surfaces the solar radiation incident thereto is converted into mechanical torques about the center of mass of the spacecraft.

Reference is now directed particularly to FIGURES 2 through 5. Secured to the extremity of each mounting arm is the bimetallic actuating element 8. Each bimetallic element when exposed to heat or cold warps in proportion to its temperature. The bimetallic elements are exposed to a heat sensor 35 within the actuator so that when, for example, the axis of the antenna mast 3 is aligned with the sun, the heat sensor 35 is partially exposed to the sun's rays and its temperature is at a value determined by the degree of exposure.

The shade 37 as shown in FIGURES 3 and 4 causes the heat sensor 35 to be exposed to the sun in varying degrees depending on the spacecraft angular position.

If the attitude of the vehicle changes from the adopted attitude, one or more of the shades may be moved in respect to the sun so that more or less of the sun's radiant heat will pass through the aperture 38 in the shade and fall on the sensor 35 thus causing that actuator to become active in damping the oscillation of the vehicle.

Reference will now be directed to FIGURES 3, 4 and 5, which illustrate an actuator means for effecting angular movement of the control surfaces or vanes 15. The actuator means includes a bracket 4 fastened to the radiating arm 2. The bracket includes a pair of parallel arms 23 which carry a pair of coaxially positioned bearings 24. The bearings are in coaxial relation in order to support a shaft structure 25. The shaft structure includes two end sections 26 formed of material having high thermal insulation properties and a center section 27 interposed between the insulation sections which is formed of metal and therefore thermally conductive. The insulation sections 26 are journalled in the bearings 24. One of the arms 23 supports a motor and gear unit 5 briefly described hereinbefore which is used for large corrections and the initial positioning of the solar vane.

The portion of the shaft structure 25 that is positioned between the arms 23 is completely surrounded by a cylindrical cage structure 28 formed of thermal insulation material. The cage 28 includes end disks 29 having centrally located circular apertures to receive the insulation sections 26 of the shaft structure 25. The apertures are preferably counterbored to receive the thermal insulation sections 26 of the shaft structure which in turn is provided with matching shoulders so as to form radiant heat barriers 30.

The thermally conductive section 27 is provided with a set of radiating spokes 31 which are formed of bimetallic plates. The radially inner and outer edges of the plates or spokes 31 are received in notches 32 formed in the conductive member 27, and notches 33 formed in the internal wall surface of the cage 28 as shown in FIGURE 4.

A control vane 15 is rigidly secured to the cage 28.

The thermal insulation section 26 opposite the motor 5 has a centrally located bore which receives an axially extending thermally conductive rod 34 of small diameter. The rod extends through the bore in the member 26 into a centrally located bore in the member 27 providing a heat path. Mounted on the outer end of the rod 34 is a radiant heat sensor 35 which may be in the form of a metal cylinder.

Supported on the arm 23 from which the heat sensor 35 extends, is a shutter plate 37 which includes a first portion disposed radially outward from the heat sensor 35 and a second portion extending in parallel relationship thereto. The second portion is provided with a slit 38 or otherwise so cut that the heat energy falling on the heat sensor 35 varies with the angle 21 (FIGURE 2) to the sun.

Operation of the control vane actuator is as follows:

With reference to FIGURE 2, the solar panels or arms 2 are in front of the center of mass 20 of the spacecraft, that is, toward the sun with respect to the center of mass. Thus, the spacecraft is basically unstable except for control vanes 15. An angular error indicated by 21 will cause an unbalanced torque which will tend to increase this angle.

Radiant energy absorbed by the heat sensor 35 is conducted by the rod 34 to the thermally conductive section 27. This section in turn transmits its heat energy to the bimetallic plates or spokes 31 causing the spokes to warp as indicated in FIGURE 5 thereby turning the cage 28 relative to the shaft structure 25 and effecting correspondingly angular displacement of the control vanes 15 in relationship to the vehicle.

The control surfaces define positive angles designated 22 with respect to the solar panels. By choice of areas and lengths and positive angles of the control surfaces, the spacecraft may be rendered stable. Under this stable condition, an angular error 21 will then cause an unbalanced torque which will tend to decrease this angle. If the spacecraft is given an impulse, it would tend to oscillate about the center of mass 20 unless damping means are used.

The arrangement of the control vanes 15 and shutters 37 and heat sensors 35 and their effect on the bimetallic elements 8 may be predetermined so that the desired damping effect may be readily attainable. That is, if the spacecraft is in an oscillatory mode the shutters differentially expose the bimetallic elements to counteract or damp oscillation. This is aided by utilizing the thermal inertia of the bimetallic elements.

Heat sensor 35 also serves to extract heat from the thermal conductive section 27 when it is shaded which in turn extracts heat from the bimetallic plates or spokes so as to cause the cage 28 to rotate in the opposite direction.

The rate of heat transfer to or from the bimetallic plates is relatively slow as the transfer must take place through the relatively small rod 34. Also, the thermal conductive section 27 has a relatively large mass so that it will not respond to transient changes or reversals in heat flow.

The relationship of each heat sensor 35 and shutter 37 is such that when the spacecraft is in the desired orientation with respect to the sun, equal amounts of radiant energy are received by the four heat sensors so that all of the control surfaces will occupy positions which tend to maintain the spacecraft in its sun oriented position.

Deviation of the spacecraft from the desired orientation causes the appropriate heat sensors to receive more or less of the sun's radiant energy to cause the corresponding movement of the control surfaces.

While the attitude control has been described here as the sole control of the attitude of a spacecraft and in many cases could constitute the sole control, it may be operated in conjunction with other controls to accomplish fine or vernier adjustment of the spacecraft.

The attitude control herein disclosed is capable of maintaining a spacecraft within a small fraction of a degree of the desired attitude.

While particular embodiments of this invention have been shown and described, it is not intended to limit the same to the exact details of the constructions set forth, and it embraces such changes, modifications, and equivalents of the parts and their formation and ararngement as come within the purview of the appended claims.

What is claimed:

1. A solar vane actuator for a spacecraft comprising:
   a bimetallic actuating means consisting of a rigidly held structure mounted to said spacecraft and including a rotatable shaft structure therein, a hollow cage structure adapted to enclose said shaft structure, said cage structure being rotatably mounted thereon, a plurality of bimetal spokes operably connecting said shaft structure and said cage in a manner so that said cage structure is rotated about said shaft structure with temperature change, and a vane disposed on said cage structure and positioned with respect to said spacecraft body in a manner so as to damp the oscillatory motion of said spacecraft.

2. A solar vane actuator for a spacecraft comprising:
   a mounting bracket capable of being mounted on a spacecraft, including two parallel radiating arms in spaced relationship to one another and extending therefrom, a shaft structure rotatably mounted between said radiating arms, remote from said spacecraft, said shaft structure consisting of two end members constructed of thermal insulation materials and a central connecting member constructed of a thermal conducting material rigidly joining said end members, a cylindrical cage structure constructed of thermal insulation material adapted to receive a solar vane, said cage structure being capable of enclosing said shaft structure and rotatably mounted thereon and, bimetallic spoke members disposed between said cage structure and said thermal conducting member in a manner so as to cause rotation of said cage structure about said shaft structure with temperature changes thereof.

3. A solar vane actuator for a spacecraft comprising:
   mounting means for mounting said actuator on said spacecraft, including two radiating arms extending therefrom adapted to receive a shaft structure therebetween, said shaft structure consisting of a pair of end members constructed of thermal insulation materials connected by a central thermal conducting member, a cylindrical cage structure constructed of thermal insulation material adapted to enclose said shaft structure and rotatably mounted thereon, bimetallic spoke members operatively connected between said central thermal conducting member of said shaft structure and said cage structure in a manner so as to cause rotation of said cage structure about said shaft structure when said spoke members experience temperature change, a thermal sensing and thermal conducting arrangement mounted adjacent said shaft structure adapted to transmit thermal changes to said central thermal conducting member of said shaft structure and a solar vane mounted on said cage structure in a manner so as to be positioned in respect to said spacecraft body in order to alter the attitude thereof.

4. A solar vane actuator for a spacecraft comprising: a mounting bracket capable of being mounted on a spacecraft, including two parallel radiating arms extending outwardly therefrom, a shaft structure rotatably mounted on said radiating arms remote from said spacecraft, said shaft structure consisting of two ends constructed of thermal insulation material and a central connecting member constructed of thermal conducting material, a cylindrical cage structure for actuating said vane, constructed of thermal insulation material, which is capable of enclosing said shaft structure, and rotatably mounted thereon, bimetallic spoke members disposed between said cage structure and said thermal conductive member of said shaft structure in a manner so as to cause rotation of said cage structure around said shaft structure when said spoke members experience temperature change, and temperature control means for controlling said temperature changes of said bimetallic spoke members so as to cause said vane to be moved relative to said spacecraft causing a change in the attitude thereof.

5. A solar vane actuator for a spacecraft as described in claim 4 wherein said shaft structure is operatively mounted to a positioning motor mounted on said mounting bracket adjacent said actuator.

6. A solar vane actuator for a spacecraft as described in claim 5 wherein said temperature control means consists of a cylindrical heat sensor in combination with a small diameter thermal conductive rod arranged on the axis of said shaft in a manner so as to gather and transmit the sun's heat to said connecting thermal conducting member thereof, said sensor being protected from the sun's rays by a shade providing means for the sun's rays to fall upon said sensor when said spacecraft becomes misaligned.

7. In an attitude control system for a spacecraft including a central body, a plurality of arms radiating from said central body, solar vanes at the extremities of said arms and an actuator for pivotally connecting each said vane to the extremity of each said arm, the improvement comprising:

means for mounting said actuator at the extremity of each said radiating arm, a multi-member shaft structure pivotally mounted within said means, one of said shaft members constructed of thermal conducting material, a cylindrical cage structure enclosing said shaft structure and rotatably mounted thereon, a solar vane rigidly connected to said cage structure, a plurality of bimetallic members operatively connected to said thermal conducting shaft member and said cylindrical cage structure, a thermal sensing means mounted adjacent said shaft structure, and means for connecting said thermal sensing means to said thermal conducting shaft member whereby changes of thermal radiation on said thermal sensing means causes deformation of said bimetallic members and rotation of said cage structure and said solar vane relative to said arm.

8. In an attitude control system for a spacecraft including a central body, a plurality of arms radiating from said central body, solar vanes at the extremities of said arms and an actuator for pivotally connecting each said vane to the extremity of said arm, the improvement comprising:

means for mounting said actuator at the extremity of each said radiating arm, a multi-member shaft structure pivotally mounted within said means, one of said shaft members constructed of thermal conducting material, a cylindrical cage structure adapted to insulate said shaft structure enclosing said shaft structure and rotatably mounted thereon, a solar vane rigidly connected to said cage structure, a plurality of bimetallic members operatively connected to said thermal conducting shaft member and said cylindrical cage structure, a thermal sensing means mounted adjacent said shaft structure, and means for connecting said thermal sensing means to said thermal conducting shaft member whereby changes of thermal radiation on said thermal sensing means causes deformation of said bimetallic members and rotation of said cage structure and said solar vane relative to said spacecraft.

References Cited

UNITED STATES PATENTS

| | | | |
|---|---|---|---|
| 3,304,028 | 2/1967 | Nicklas et al. | 244—1 |
| 3,311,322 | 3/1967 | Zimmerman | 244—1 |

FERGUS S. MIDDLETON, *Primary Examiner.*